US009658309B2

(12) United States Patent
Amendolare et al.

(10) Patent No.: US 9,658,309 B2
(45) Date of Patent: May 23, 2017

(54) PRECISION LOCATION METHOD AND SYSTEM

(76) Inventors: Vincent Thomas Amendolare, Worcester, MA (US); R. James Duckworth, Shrewsbury, MA (US); David Cyganski, Holden, MA (US)

( * ) Notice: Subject to any disclaimer, the term of this patent is extended or adjusted under 35 U.S.C. 154(b) by 1335 days.

(21) Appl. No.: 13/522,937

(22) PCT Filed: Jan. 19, 2011

(86) PCT No.: PCT/US2011/021750
§ 371 (c)(1),
(2), (4) Date: Jul. 18, 2012

(87) PCT Pub. No.: WO2011/091062
PCT Pub. Date: Jul. 28, 2011

(65) Prior Publication Data
US 2012/0293372 A1   Nov. 22, 2012

Related U.S. Application Data

(60) Provisional application No. 61/336,372, filed on Jan. 20, 2010.

(51) Int. Cl.
*G01S 3/02*   (2006.01)
*G01S 5/02*   (2010.01)
*H04W 4/04*   (2009.01)

(52) U.S. Cl.
CPC ............ *G01S 5/02* (2013.01); *G01S 5/0252* (2013.01); *H04W 4/043* (2013.01); *G01S 5/0221* (2013.01); *G01S 5/0226* (2013.01); *H04W 4/04* (2013.01)

(58) Field of Classification Search
CPC . G01S 5/02; G01S 5/0252; G01S 5/06; G01S 5/0221; G01S 1/026; G01S 1/02; H04W 4/04; H04W 4/043

(Continued)

(56) References Cited

U.S. PATENT DOCUMENTS 5,719,584 A * 2/1998 Otto ......................... G01S 5/12
                                                       342/387
6,564,065 B1 * 5/2003 Chang ................... H04W 64/00
                                                       342/357.29

(Continued)

FOREIGN PATENT DOCUMENTS

WO   WO 2008/156700        12/2008
WO   WO-2008/156700 A2 * 12/2008   ............... G01S 5/02

OTHER PUBLICATIONS

"Survey of Wireless Indoor Positioning Techniques and Systems"; Liu et al.; Systems, Man, and Cybernetics, Part C: Applications and Reviews; IEEE Transactions on (Vol. 37 , Issue: 6 ); pp. 1067-1080; Date: Nov. 2007.*

(Continued)

*Primary Examiner* — Chuong P Nguyen
(74) *Attorney, Agent, or Firm* — Ropes & Gray, LLP

(57) ABSTRACT

Systems and methods for locating an object are disclosed herein. The locator system includes a plurality of reference units and a processor in communication with the reference units. The reference units are positioned about a region in which a mobile unit is located, and each reference unit includes a transceiver for transmitting and receiving a transaction-based location signal to and from the mobile unit. The processor is configured for estimating time offsets between the mobile unit and reference units and aligning the transaction-based location signals from the reference units by removing the time offsets. The processor is further configured for collectively processing data representative of the aligned location signals based on a plurality of potential locations to identify at least one of the potential locations as a likely mobile unit location.

5 Claims, 9 Drawing Sheets

(58) Field of Classification Search
USPC ............................... 342/451, 465; 455/456.1
See application file for complete search history.

(56) References Cited

U.S. PATENT DOCUMENTS

| | | | | |
|---|---|---|---|---|
| 6,861,982 B2* | 3/2005 | Forstrom | ............ | G01C 21/206 342/387 |
| 7,132,981 B1* | 11/2006 | Roberts | ................ | G01C 21/206 342/442 |
| 7,292,189 B2* | 11/2007 | Orr | ........................ | G01S 5/06 342/387 |
| 8,331,953 B2* | 12/2012 | Carlson | ..................... | G01S 5/12 455/456.1 |
| 8,630,656 B2* | 1/2014 | Rowe | ........................ | G01S 5/02 340/988 |
| 8,928,459 B2* | 1/2015 | Cyganski | ............... | G01S 1/026 340/10.1 |
| 9,020,523 B2* | 4/2015 | Moeglein | ............... | G01S 5/0205 370/338 |
| 9,037,155 B2* | 5/2015 | Fischer | .................. | G01S 5/021 342/385 |
| 2001/0004601 A1* | 6/2001 | Drane | .................... | G01S 1/024 455/456.1 |
| 2006/0244661 A1 | 11/2006 | Orr et al. | | |
| 2010/0277339 A1 | 11/2010 | Cyganski et al. | | |
| 2012/0149388 A1* | 6/2012 | West | ........................ | G01S 5/00 455/456.1 |
| 2015/0256972 A1* | 9/2015 | Markhovsky | ......... | H04W 4/023 455/456.1 |

OTHER PUBLICATIONS

"A Bayesian Fusion Algorithm for Precision Personnel Location in Indoor Environments"; Cavanaugh et al.; ION ITM 2011 Session A2: Urban and Indoor Navigation Technology 1, Jan. 24-26, 2011; pp. 1-7.*

Vincent Amendolare "WPI Precision Personnel Location System: Synchronization of Wireless Transceiver Units", Joint Navigation Conference, Jun. 2, 2009, pp. 1-25, XP007918551.

International Search Report and Written Opinion of the International Searching Authority of Application No. PCT/US2011/21750, mailed May 19, 2011.

* cited by examiner

PRECISION LOCATION METHOD AND SYSTEM

CROSS-REFERENCE RELATED APPLICATION

This application is a United States National Stage Application filing under 35 U.S.C. 371 of International Application No. PCT/US2011/21750, filed on Jan. 19, 2011, which claims the benefit of U.S. Provisional Application Ser. No. 61/336,372, filed Jan. 20, 2010, entitled Precision Location Methods and System, the entire contents of both of which are incorporated herein by reference in their entirety. International Application No. PCT/US2011/21750 was published under PCT Article 21(2) in English.

FIELD OF THE INVENTION

In general, the invention relates to locating objects by means of radio signals. More specifically, the invention relates to a system and method for locating objects in high multi-path environments precisely using a multi-signal fusion approach.

BACKGROUND OF THE INVENTION

The precise tracking of persons and/or objects is desirable in many applications. One way to achieve precision indoor location with electronic tracking systems is by ranging (estimating the distance) between one or more base stations and a mobile locator device. Known examples of electronic locating systems that perform ranging are GPS technology, in which satellite transmissions are used by mobile receivers to determine the position of the mobile receivers, and cell phone location systems, where tower-located base station receivers estimate the location of mobile hand-held cell phone transmitters.

However, in the past, several factors have hindered the use of known electronic locating systems in indoor environments. One major impediment to the use of known locator systems is multi-path signal contamination, referring to the signal scattering effect caused by the local environment between the transmitter and the receiver, such as walls, support beams, and any metal objects. Other impediments include insufficient signal strength, lack of precision, the FCC spectrum non-compliance of ultra wide band systems, the need for pre-existing infrastructure, and failure of simple pulse distortion models in actual through-building and multi-path propagation conditions.

SUMMARY OF THE INVENTION

In view of the foregoing, it would be desirable to have a locator system that has the capability to operate in high multi-path environments. It would also be desirable to have a locator system that can resolve location precisely with a relatively narrow bandwidth signal. It further would be desirable to have a locator system that does not require precise phase relationships between receiver radio frequency electronics. It would also be desirable to have a locator system that does not require a pre-existing infrastructure.

In accordance with these and other objects of the present invention, precision locator methods and systems are described. The present invention alleviates problems associated with known locator systems. The present invention has the capability to operate in high multi-path environments, can deliver location precisely with a relatively narrow bandwidth signal, generally does not require precise phase relationships between receiver radio frequency electronics, and does not require a pre-existing infrastructure.

Accordingly, systems and methods for locating an object are disclosed herein. According to one aspect, the locator system includes a plurality of reference units and a processor in communication with the reference units. The reference units are positioned about a region in which a mobile unit is located, and each reference unit includes a transceiver for transmitting and receiving a transaction-based location signal to and from the mobile unit. The processor is configured for estimating time offsets between the mobile unit and reference units and aligning the transaction-based location signals from the reference units by removing the time offsets. The processor is further configured for collectively processing data representative of the aligned location signals based on a plurality of potential locations to identify at least one of the potential locations as a likely mobile unit location.

In one example, collective processing of the representative data comprises creating a matrix of range rephased signals from the received location signals at each potential mobile unit location, and identifying at least one of the potential locations at which the magnitude of the range rephased signal has a maximum DC component relative to a remainder of the potential locations. In one example, the processor is in communication with a display for displaying the at least one identified potential location.

In one example, collectively processing data representative of the aligned signals comprises creating a matrix R where the columns of the matrix R are frequency domain data of the aligned signals, iterating through a set of hypothetical time delays by selecting a hypothetical time delay at each iteration, and creating a rephased version of matrix R at each hypothetical position.

In one example, the representative data corresponding to a location signal comprises a frequency domain representation of the location signal. The representative data corresponding to a location signal may comprise samples of the location signal.

In one example, the system further comprises a mobile unit for transmitting and receiving a plurality of transmission-based location signals. In one example, the system further comprises a second mobile unit for transmitting a second location signal, and the processor is configured to determine the location of the second mobile unit. Each reference unit may distinguish the location signal and the second location signal based upon a predetermined timing difference between the location signal and the second location signal. Each reference unit may distinguish the location signal and the second location signal based upon a predetermined difference in the frequencies of the location signal and the second location signal. In one example, each reference unit transmits data representative of the received location signal and the second location signal as they are received.

In one example, the system comprises a plurality of wireless transmitters for transmitting a plurality of location signals.

According to another aspect of the invention, collectively processing data comprises calculating a first metric at a plurality of potential locations based on aligned received signals, calculating a second metric at the plurality of potential locations based on unaligned received signals, and calculating a posterior probability distribution at the plurality of potential locations based on at least the first metric and the second metric.

According to another aspect, the invention relates to methods for carrying out the functionalities described above.

BRIEF DESCRIPTION OF THE DRAWINGS

The system and method may be better understood from the following illustrative description with reference to the following drawings in which.

DESCRIPTION OF CERTAIN ILLUSTRATIVE EMBODIMENTS

To provide an overall understanding of the invention, certain illustrative embodiments will now be described, including systems and methods for determining the location of a mobile unit. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The degradation of performance caused by the multi-path signal contamination described above is generally addressed herein by application of a diversity signal combining and position solution approach. This "multi-signal fusion" approach solves for the location (in 2D or 3D space) using multiple received location signals, simultaneously and integrally, and not by combining several independently obtained time delay solutions, as with traditional Time of Arrival (TOA) methods, or by combining several independently obtained time difference solutions, as with Time Difference of Arrival (TDOA) methods, determined respectively from each individual received signal or pairs of such signals. Instead, potential mobile unit positions in a region are applied as trial solutions until the unification of essential aspects of the direct path components of the aligned received location signals is achieved.

Figure 1:
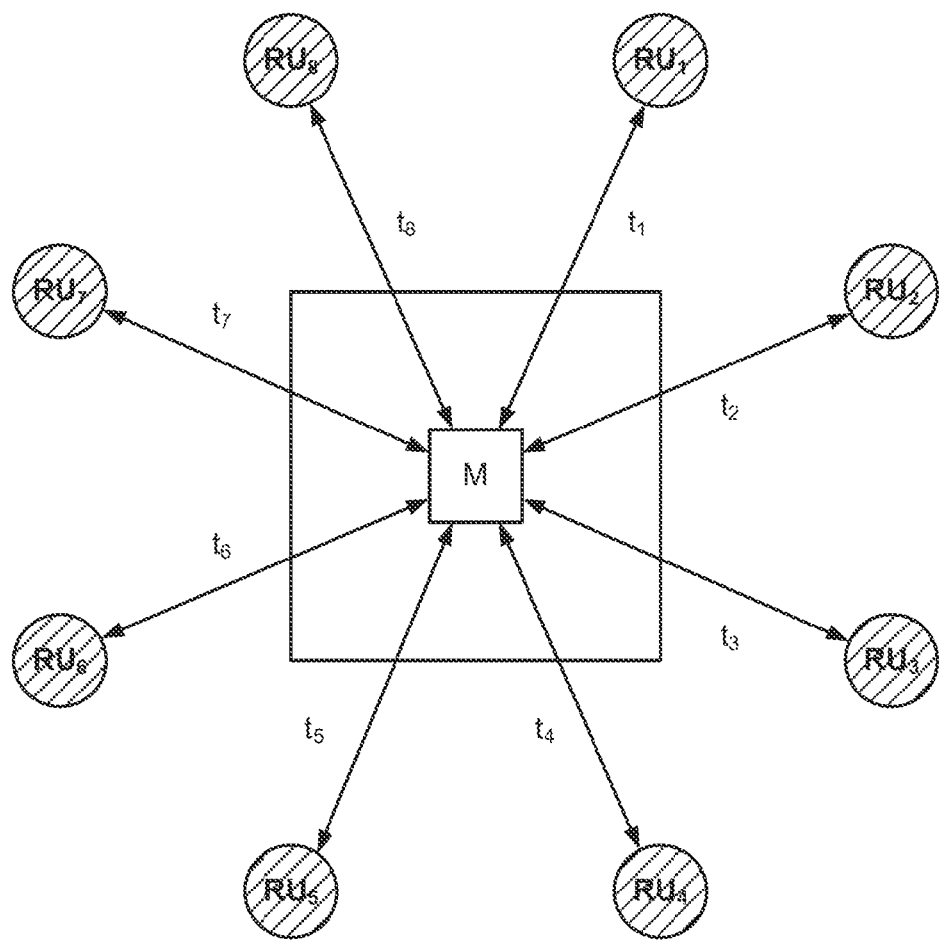
FIG. 1 is an illustrative diagram of the geometry and fundamental signal propagation delays of an exemplary locator system consistent with the principles of the present invention.

The geometry and fundamental signal propagation delays of an exemplary locator system consistent with the principles of an illustrative embodiment are depicted in FIG. 1. In this figure, a mobile unit M is shown inside a building which is surrounded by eight stationary reference units ($RU_1$-$RU_8$). A propagation delay, $t_p$, is associated with the signal path from the mobile unit to the $p^{th}$ reference point.

In general, the reference units $RU_p$ are placed about a region in which the mobile unit M is located. For example, the reference units $RU_p$ may be positioned around a building in which a firefighter carrying the mobile device M is operating. Results tend to improve as the number of reference units $RU_p$ and the diversity of location and heights of the reference units $RU_p$ increases. Preferably, the reference units $RU_p$ substantially surround the region. For example, for the case of a generally rectangular building, reference units $RU_p$ are preferably positioned along three sides of the building, though usable results may be achieved by positioning reference units $RU_p$ along two sides or even just one side of the building. In addition, particularly in situations in which positioning reference units around a building is not practical, additional reference units may be positioned within the building at various locations.

Figure 2:
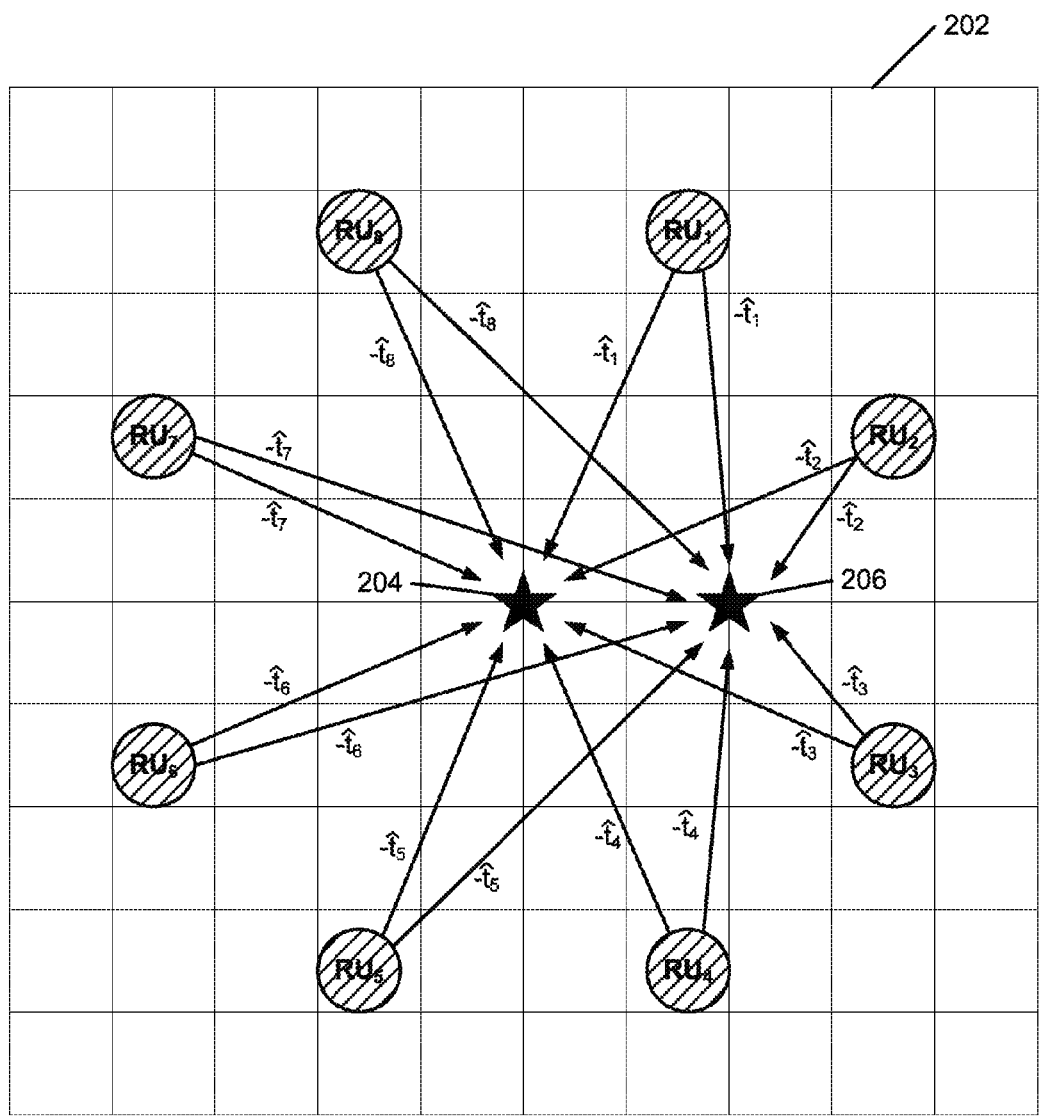
FIG. 2 is a diagram of a rephasing grid illustrating one of the principles behind an illustrative embodiment of the multi-signal fusion processing approach described herein.

FIG. 2 is a diagram of a rephasing grid 202 illustrating one of the principles behind an illustrative embodiment of the multi-signal fusion processing approach described herein. In this illustration, the only location signal received by each reference unit p is the direct signal $R_p(t)$ from the mobile unit. In a real-world application, however, multi-path effects may cause reflected signals to also be received by reference units. The rephasing grid 202 identifies the fixed position of eight references units $RU_1$ through $RU_8$, depicted on the grid as circles. In addition, the grid displays the inverse of signal delays $\hat{t}_p$ (i.e., the signal delay expected if the mobile unit were in fact located at that position) associated with two potential positions 204 and 206 of a mobile unit, depicted as stars. In deriving the metric at each of the potential positions, the base station computer generally applies the inverse of signal delay $\hat{t}_p$ to each received signal, $R_p(t)$, so that a set of rephased received location signals, $$R'_p(t) = R_p(t - \hat{t}_p) = a\, x(t) e^{-j\Phi}$$

is formed, where a is an amplitude factor that is a function of all the amplitudes of the direct path received components received at the receiving antennas. In the equation, $R_p(t)$ denotes a location signal received at the $p^{th}$ reference unit, and $R'_p(t)$ is a range rephased received location signal. That is, $R'_p(t)$ corresponds to the signal $R_p(t)$ had it not traveled a distance that would result in a propagation delay of $\hat{t}_n$. In the equation, x(t) is the transmitted location signal, and $ae^{-j\Phi}$ is the amplitude and phase by which the rephased received location signal $R'_p(t)$ differs from the transmitted signal x(t). In analyzing a set of potential mobile unit locations (for example, in step 516 of FIG. 5A), if a potential mobile unit location corresponds to the correct mobile unit location, the rephased received location signals from each reference unit are identical to within a constant amplitude and phase factor of each other. Thus, the ultimate goal of the multi-signal fusion based location estimation process is to find the location which results in the above unification of the rephased location signals.

Figure 3:
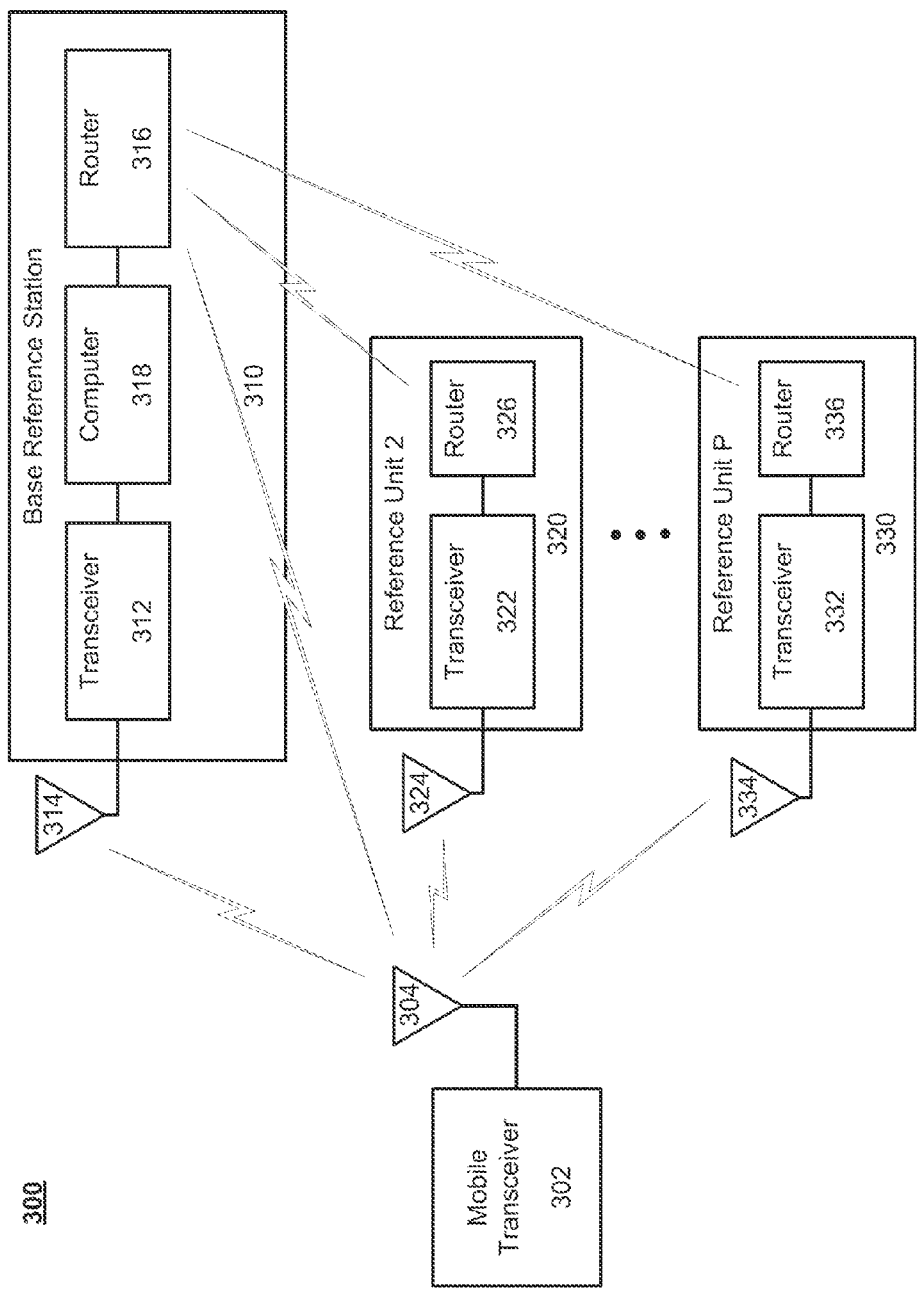
FIG. 3 is a block diagram of a system for precision location, according to an illustrative embodiment of the invention.

A block diagram showing the hardware elements of a system for location estimation 300 and the inter-element connections is depicted in FIG. 3. Mobile transceiver 302, similar to mobile unit M in FIG. 1, would be inside a region or building surrounded by P reference units such as 310, 320, and 330, which are similar to $RU_1$-$RU_8$ in FIG. 1. The mobile transceiver may be a component of a larger system containing, for example, distress or diagnostics features. The mobile transceiver may be capable of detecting its user's vital signs and environmental information including barometric pressure and air temperature and sending this data using a different frequency band (e.g. an ISM band) from the frequency band used for the location signal. The mobile transceiver generates an analog location signal and transmits it via antenna 304. The location signal is preferably composed of unmodulated RF base band signals at a plurality of frequencies. Preferably the frequencies are selected to be sufficiently close such that differences in their phase shifts due to intervening material properties (for example, from passing through walls and other building materials) are negligible. In one implementation, the number of selected frequencies is on the order of 100, for example in the 550-700 MHz band.

To determine the location of the mobile transmitter, antennas 314, 324, and 334 receive the location signal transmitted by the mobile antenna 304 and send the signal to reference transceivers 312, 322, and 332, respectively. In another embodiment, each reference unit consists of multiple antennas and a single shared router. In this embodiment, the reference unit may have a single transceiver for processing all of the antenna inputs, or a dedicated transceiver for each antenna. Mobile transceiver 302 and reference transceivers may be the same type of transceiver. An exemplary hardware implementation for the mobile and reference transceivers is discussed in relation to FIG. 6. The transceiver 312, shown connected by a wire to computer 318, digitizes the received signal and sends it directly to computer 318 for processing. The transceivers 322 and 332 digitize their received signals and pass them via wired connections to wireless routers 326 and 336, respectively. The wireless routers 326 and 336 transmit their respective reference unit's received location signals to the wireless router 316, which sends the received location signals via a wired connection to the computer 318 for processing. The wireless connections between router 316 and routers 326 and 336 may be transmitted through any wireless connection, such as a ZIGBEE, BLUETOOTH, or WI-FI connection. Alternatively, there may be wired connections (not shown) between the computer and the reference units, eliminating the need for wireless routers in reference units 2 through P. In another embodiment, there is no base reference station, and the computer is separate from the reference units.

The base station computer 318 analyzes the received data to estimate the location of the mobile transceiver 302. The base station computer may be any known computing device, including a personal computer, a laptop computer, a personal digital assistant, or other computing devices with general purpose processors that are configured to output an estimated location.

One such method for determining the location of the mobile transceiver 302 using the location estimation system 300 is transactional array reconciliation tomography (TART), which depends on the time synchronization of the mobile and reference units so that the time of arrival is known. To perform TART, the wireless links between the mobile unit 302 and reference transceivers 312-332 are also used to synchronize the transceivers. The mobile transceiver 302 and reference transceivers 312-332 exchange a synchronizing transaction, in which synchronization signals are transmitted by each reference transceiver 312-332 and captured by the mobile transceiver 302, and another synchronization signal is transmitted by the mobile transceiver 302 and captured by each reference transceiver 312-332. These synchronization signals or a subset of the synchronization signals may be the same as the location signals used for location estimation.

The synchronization process, discussed in the Synchronization section that follows, will be described in overview in relation to FIG. 4A, and described in further detail in relation to FIG. 4B. Following the discussion of mobile unit and reference unit synchronization, methods for location estimation using the synchronized signal will be described. An overview of the location determination process will be discussed in relation to FIG. 5A. Several algorithms for estimating the location of the mobile unit will be presented and described in relation to FIG. 5B.

Synchronization

An overview of the method for synchronization will be described in relation to FIG. 4A. Then, the channel response will be discussed in detail in relation to FIG. 4B and an algorithm for determining the time offsets will be presented.

Because the clocks of mobile unit and the reference units are controlled by different oscillators, the clocks of the mobile and all of the reference units will be randomly offset from each other in time. In order to know the absolute time delay, or time of arrival, a synchronization transaction between the mobile unit 404 and each reference unit 406 can be generated and processed at the base station computer 402, as shown in FIG. 4A. The base station computer can then align the received location signals. As shown in FIG. 4A, the mobile unit first transmits a multicarrier transmission synchronization signal 408 to each reference unit at time $t_0$. Soon thereafter at time $t_1$, each of the reference units sends the same multicarrier transmission synchronization signal 410 to the mobile unit. Then, both the mobile unit and reference units send the received synchronization signal data 412 and 414 to the base station computer 402, which may be similar to base station computer 318. Through a method described in detail with respect to FIG. 4B, the base station computer 402 is able to calculate the time offset between the mobile and reference units.

Figure 4A:
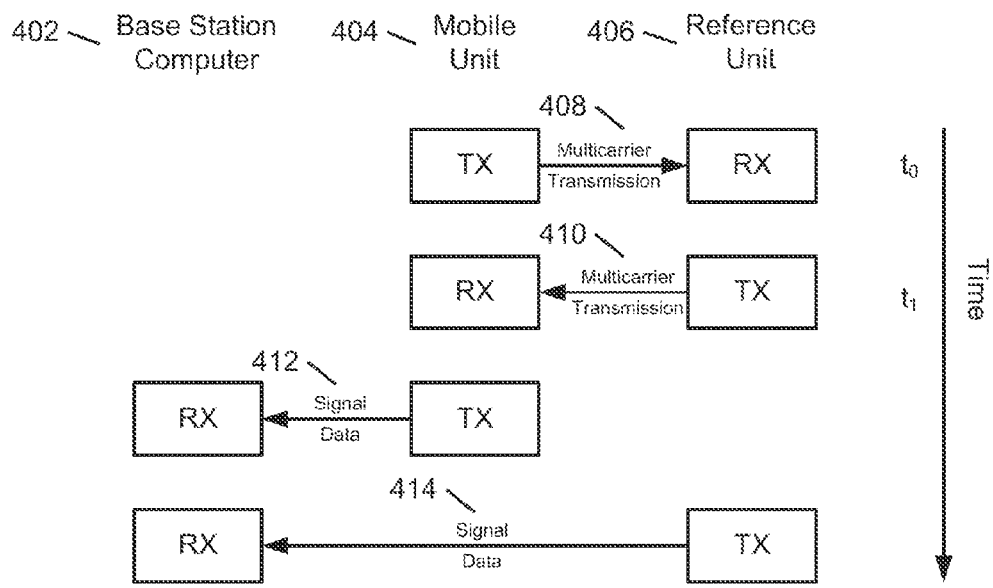
FIG. 4A is a sequence diagram of transactional synchronization according to an illustrative embodiment of the invention.

While in FIG. 4A the reference unit is shown transmitting to the mobile station first, followed by the mobile unit transmitting to the reference unit, the order of the synchronization signals is not important. In addition to the signal transmissions shown in FIG. 4A, there may be an additional transmission from the reference unit to the mobile unit for estimating the clock drift of the mobile unit over the time of the transaction. In one implementation, in order to maintain alignment over time, the time between synchronization transactions is no more than on the order of tens of milliseconds.

Figure 4B:
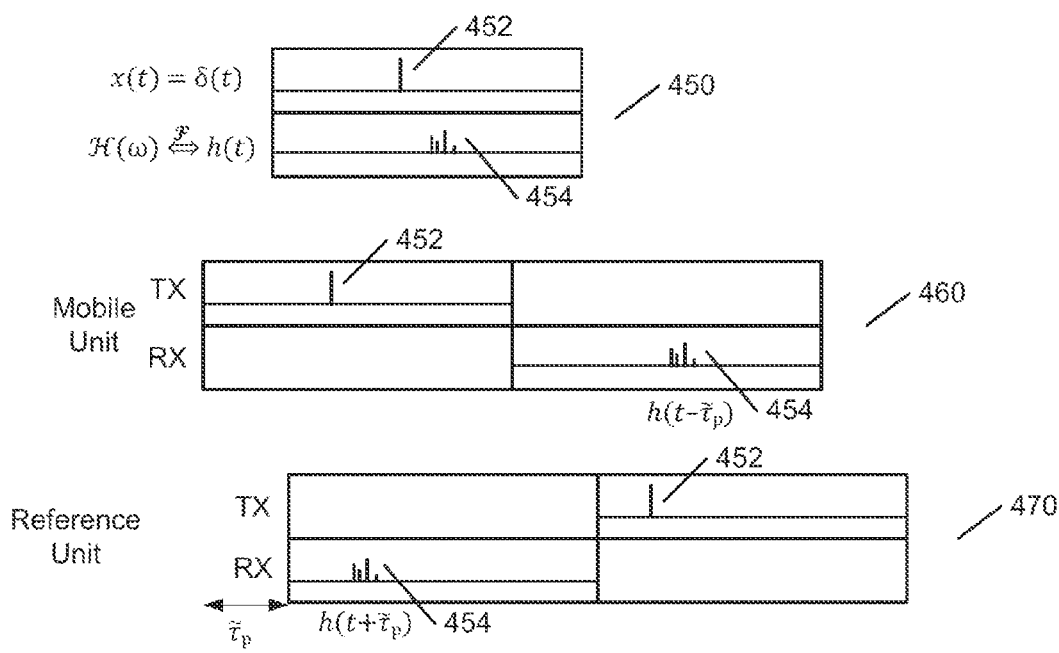
FIG. 4B is a diagram of transactional synchronization impulse responses illustrating one of the principles behind an illustrative embodiment of the multi-signal fusion processing approach described herein.

FIG. 4B is a diagram of transactional synchronization impulse signals and responses illustrating a method of synchronizing the mobile unit and the reference units. As stated above, the synchronization signal is preferably a multicarrier signal. However, for purposes of illustration, the transmitted synchronization signal 452 shown in 450 FIG. 4B is an impulse in the time domain, $x(t)=\delta(t)$. The ideal received signal received after the signal travels through a multipath channel is the impulse response of the channel $h(t)$, illustrated as 454. The impulse response 454 consists of several summed versions of the input signal, with various attenuations and delays, which is consistent with a multipath channel model.

The mobile unit and reference units are driven by their own oscillators, creating mismatch and frequency drift between the mixer frequencies and sample clock frequencies. Each oscillator is also stochastically time-varying due to thermal fluctuations. Mobile transmission windows 460 and reference receiving windows 470 should be aligned in time. However, over time, independent oscillators create random time offsets between the mobile unit's transmit windows and each reference unit's receive windows. Before synchronization, the mobile unit's windows 460 and a reference unit's windows 470 have a random time offset $\tilde{t}_p$. Thus the transmit and receive windows will not line up in time, but rather will be shifted from one another by $\tilde{e}_p$ as shown in FIG. 4B. If the reference units are not synchronized, each reference unit will have a different time offset $\tilde{e}_p$ from the mobile unit. If the mobile transceiver transmits a signal x(t), each reference transceiver p would receive $h(t-\tilde{e}_p)$, complying with the notion of received signals having a random time offset. Shortly after this initial signal capture, a second capture takes place where the reference transceiver transmits and the mobile transceiver receives. This received signal will be $h(t+\tilde{e}_p)$, the same as the first received signal but with a shift of $\tilde{e}_p$ in the opposite direction. This assumes that the radio channel response obeys Lorentz Reciprocity. That knowledge of $h(t-\tilde{e}_p)$ and $h(t+\tilde{e}_p)$ allows solving for the unknown random time offset $\tilde{e}_p$ by the following process.

For a transaction with a multicarrier synchronization signal and a non-ideal synchronization discussed above, the received synchronization signals in the frequency domain would be:

$$r_q = h_{m,p} \circ e^{-j(\omega \tilde{t}_p + \theta_q)}$$

$$r_p = h_{m,p} \circ e^{-j(-\omega \tilde{t}_p + \theta_p)}$$

where $r_q$ and $r_p$ are the synchronization signals received by the mobile transceiver q and reference transceiver p, respectively, and $h_{q,p}$ is the reciprocal channel response between the two units. Received synchronization signals have the same random time offset in opposite directions.

After receiving the received synchronization signals from the mobile and reference units, the base station computer divides the frequency domain representation of the received signals, which cancels out the channel response term:

$$\frac{[r_p]}{[r_q]} = e^{j(2\omega \tilde{t}_p - \theta_p + \theta_q)}$$

The result is a complex sinusoid with a periodicity that corresponds to $2\tilde{t}_p$. The base station computer may estimate the periodicity of this complex sinusoid using a Direct State Space pole solver, a frequency estimation technique using Singular Value Decomposition, or another suitable estimation method. The Direct State Space technique ignores frequency independent phase terms, so the random frequency independent phase terms $\theta_q$ and $\theta_p$ are acceptable. The estimated pole is:

$$\text{pole}\frac{[r_p]}{[r_q]} = e^{j(2\Delta\omega \tilde{t}_p)}$$

The angle of the complex pole is:

$$\angle\text{pole}\frac{[r_p]}{[r_q]} = 2\Delta\omega \tilde{t}_p + 2\pi a$$

where a is an integer. Then the time offset $\tilde{t}_p$ is:

$$\tilde{t}_p = \frac{\angle\text{pole}\frac{[r_p]}{[r_q]}}{2\Delta\omega} - \frac{aT}{2}$$

where T is the period of the multicarrier synchronization signal. Solving for $\tilde{t}_p$ yields infinite solutions, one for each integer value of a. Since the multicarrier signal is periodic, any transmitted or received signal is unaffected by a time shift that is an integer number of periods, so only solutions for $\tilde{t}_p$ in the interval [0, T) are considered. Thus, there are only possible solutions for a=0 and a=−1.

In one embodiment, for a multicarrier signal with period T serving as both the location and synchronization signal, it may not be possible to distinguish between the two poles, and choosing incorrectly may result in a large timing error. In order to determine the correct $\tilde{t}_p$ for aligning or rectifying a multicarrier location signal with period T, a multicarrier synchronization signal $\ddot{x}(t)$ with at least about twice as many carriers and at least about half the carrier spacing is preferably used, although in some embodiments it may be possible to use fewer additional carriers while still resolving the time-offset ambiguity. The period of a synchronization signal with twice as many characters is $$2T = \frac{2}{2\pi\Delta\omega},$$

allowing proper estimation of $\tilde{t}_p$ as follows:

$$\tilde{t}_p = \frac{\angle\text{pole}\frac{[\ddot{r}_p]}{[\ddot{r}_q]}}{2\Delta\omega}.$$

The original multicarrier location signal x(t) is a subset of the frequencies of synchronization signal $\ddot{x}(t)$, so the received location signal vector r may be constructed as a subset of the received synchronization signal vector $\ddot{r}$. Once the time offset $\tilde{t}_p$ has been determined, the received location signal from each reference unit p may be rectified. The unsynchronized received location signal $r_p = h_{m,p} \circ e^{-j(-\omega \tilde{t}_p + \theta_p)}$ can be simplified by eliminating the $\omega \tilde{t}_p$ term.

Methods for Position Estimation

Figure 5A:
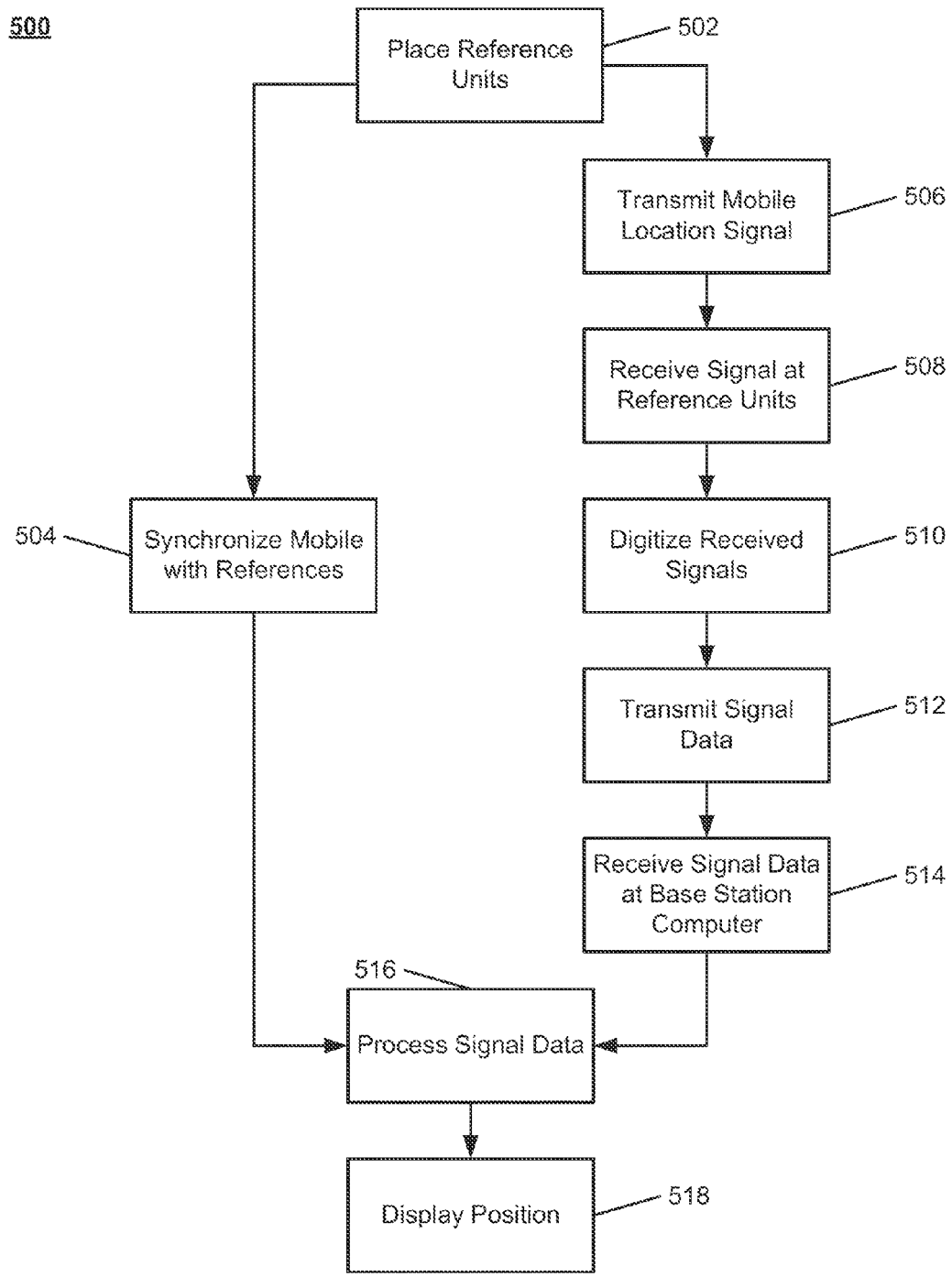
FIGS. 5A and 5B are flowcharts of a method of determining the location of a mobile unit, according to an illustrative embodiment of the invention.
Figure 5B:
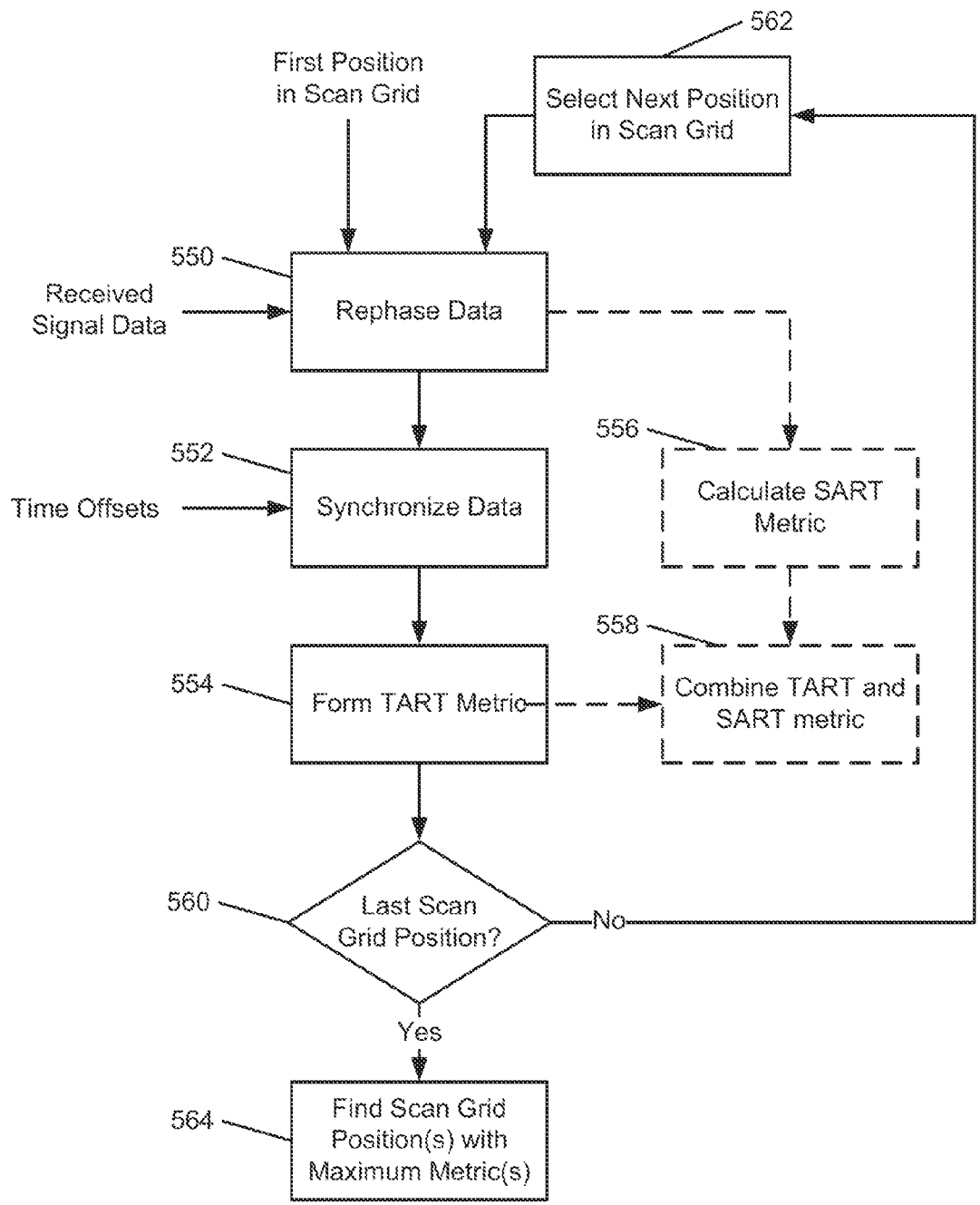

FIGS. 5A and 5B are flow charts describing methods for determining a location of a mobile unit in the environment described above with respect to FIG. 1, according to an illustrative embodiment of the invention. First, in relation to FIG. 5A, a method for generating, transmitting, and processing location data using the system elements described above in relation to FIG. 3 to estimate the location of a mobile unit in a region will be described. Then, in relation to FIG. 5B, algorithms for processing the location data and calculating a location estimate will be presented and discussed in detail.

The location estimation method 500 begins with the placing of the plurality of reference units RU about a region in which the mobile unit M is located (step 502), as discussed in relation to FIG. 1. The positions of the reference units may be known or determined after being placed. Once the references are placed, two processes are performed in parallel. Location signals are transmitted from the mobile transceiver to the reference units, which transmit the received signals to the base station computer for processing (steps 506 through 514). At the same time, the mobile unit is synchronized with the reference units (step 504) by calculating the random time offset $\tilde{t}_p$ and rectifying the received location signals, as discussed above in relation to FIGS. 4A and 4B.

While the mobile unit and reference unit are synchronized, the mobile unit transmits a location signal (step 506). The location signal is preferably composed of unmodulated RF base band signals at a plurality of frequencies. Preferably the span of the frequencies is selected to be sufficiently small such that differences in phase shift due to intervening material properties (for example, from passing through walls and other building materials) are negligible. Additionally, a bandwidth extrapolation technique may be used to synthetically increase the bandwidth. This technique fits an autoregressive model to the received frequency data from which additional frequency samples are extrapolated.

In one implementation, in a residential building, on the order of 100 frequencies in the 550-700 MHz band are selected. However, the frequency band and number of carriers is dependent on a number of factors, and the frequencies chosen can vary widely based on these factors. For example, for a residential building, frequencies on the order of gigahertz may provide increased performance, while in a structure built from brick, mortar, or concrete, lower frequencies on the order of hundreds of megahertz may provide increased performance. However, suitable results may be obtained at frequencies from about 100 MHz up to about 10 GHz. For these and other applications, depending on the material properties in the region and desired precision of the location estimates, higher or lower frequencies may be desirable. Furthermore, frequency selection may be dependent upon regulatory requirements, such as FCC regulations. Carrier spacing is also be based on the size of the frequency band and allowable frequencies. In general, it is preferable for frequencies to be closely spaced across a wide band. The closer spaced the frequencies, the greater an area in which a mobile unit can be located unambiguously. The aforementioned frequencies and considerations are intended to be exemplary, rather than restrictive, in nature.

As was discussed above in relation to FIG. 4B, the location signal may be the same signal as the synchronization signal transmitted by the mobile unit. In this case, the frequencies of the location signal are a subset of frequencies of the synchronization signals. An exemplary transmitted multicarrier signal $x(t)=\Sigma_{m=0}^{M+1} e^{-j(t(\omega_0+m\Delta\omega)+\theta_m)}$ is the sum of M sinusoids spaced $\Delta\omega$ apart in frequency, the lowest frequency sinusoid having frequency $\omega_0$, and each sinusoid having initial phase angle $\theta_m$. The Fourier transform of the transmitted multicarrier signal is:

$$X(\omega)=\Sigma_{m=0}^{M-1}\delta(\omega-(\omega_0-m\Delta\omega)+\theta_m)e^{j\theta_m}$$

The location signal, stored in the mobile unit's memory, is converted to an analog signal using a digital to analog converter (DAC). The chosen carrier frequencies are generally too high to be the direct output of the DAC, so the baseband signal is upconverted to a higher frequency by an RF mixer before being transmitted by the antenna of the mobile unit.

The reference units receive the location signal at their respective locations (step 508). In certain environments, such as inside a building, reflectors may cause a multipath signal in which the transmitted signal may interact with a reflector to create a reflected signal also received by one or more reference units. Thus, in general, P reference units, indexed by p, receive N total direct and/or reflected signals, indexed by n; the received signal at P is a sum of direct and/or reflected signals. The reference units digitize the received location signal (step 510) using an analog to digital converter (ADC). The location signal may be at too high a frequency to be converted by the ADC. Thus, an RF mixer at the same frequency as the upconverting RF mixer in the mobile unit downconverts the received analog signal before it is received by the ADC.

The received location signal in the frequency domain is $R(\omega)=H(\omega)X(\omega)$, wherein $H(\omega)$ is the frequency response of the channel. In one implementation, the transceiver discretizes the location signals into a M×1 matrix in which the $m^{th}$ element is the received signal at frequency $\omega_0+m\Delta\omega$, so $R(\omega)$ is an M×P matrix. If a received signal frequency is not precisely one of the m frequencies, most of the energy is reflected in the nearest frequency element, possibly with slight leakage into other elements. Certain considerations, such as the selection of the mixer frequency for upconversion and downconversion, help minimize leakage. Further processing is performed in the frequency domain. In a different implementation, the transceiver sends the raw data to the base station computer which performs the discretization.

The P reference units then transmit data corresponding to the N received signals to a base station computer (step 512). The signal data may be transmitted over a hardwired link or a wireless link, such as a ZIGBEE, BLUETOOTH, or WI-FI connection.

The base station computer then receives (step 514) the location signal data from the reference units RU and processes them in a unified, collective fashion (step 516). More particularly, the base station computer processes the signal data based on the following principles:

If the actual distance from the mobile unit to a given reference unit were known, the difference in phase between a transmitted signal from a mobile unit and the signal as it is received by the reference unit can be accounted for, but for a phase shift caused by a time offset in the local oscillator of the reference unit and by specific characteristics of the channel (for example, the types of materials the signal propagated through from the mobile unit to the reference unit).

The bandwidth of the transmitted location signal can be set to be sufficiently narrow that the phase shift caused by channel characteristics is, for all practical purposes, frequency independent.

The phase shift caused by the time offset of the local oscillator is also frequency independent.

Ignoring multi-path issues, assuming the receipt of location signal data from at least four reference units, there is only one set of propagation delays, i.e., one set of mobile-reference distances and one mobile unit location, which if subtracted from the signals received by the reference units, would result in each of the received signals being different from the transmitted signal by a reference unit dependent, but frequency independent, constant phase. If constraints on potential positions are assumed, fewer received signals may be sufficient.

Absent issues of multi-path, any other position would result in a frequency dependent phase shift in addition to the frequency independent phase shift between the signals received by the reference units.

Based on the above principles, by comparing characteristics of the received location signals at a set of possible mobile unit locations, one or more locations can be identified as likely actual locations. Thus, the processing (step 516) carried out by the processor of the base station computer includes comparing each of the received signals at each of a plurality of assumed positions and identifying specific locations as being likely mobile unit locations. More particularly, this processing is based upon an evaluation of a metric for each potential mobile unit position $[x_k, y_k, z_k]$ in the region of interest based on the received signals. Several illustrative metrics are discussed further in relation to FIG. 5B. Ultimately a 2D or 3D metric function is formed in which peak values identify the mobile unit position. Knowledge of the positions of signal reflectors, while not critical to the end user, can provide useful engineering and diagnostic data. After likely mobile unit positions are determined in step 516, the positions are displayed to a user in step 518.

FIG. 5B depicts a flow chart for calculating several metrics from the location signals to estimate the location of the mobile unit. In order to estimate a mobile unit's location from the received signal matrix, the received location signals are used to calculate a metric at a every point or position in a "scan grid" (a discrete set of points in the solution space), as demonstrated by the loop around FIG. 5B. A moderately sized scan grid for a small building may be on the order of 10,000 points. The loop starts by analyzing the first scan grid position according to one of several methods that will be described in detail in relation to steps 550 through 558. After the first and all subsequent iterations, the computer determines if the last grid position has been reached (step 560). If the last scan grid position has not been reached, the next position in the scan grid is selected (step 562) and one or more metrics for that scan grid position are calculated until at least one metric has been calculated for every scan grid position. Then, the scan grid position with the highest metric, which correlates to the most likely position, is identified (step 564).

At each of these scan grid positions, at least one metric is calculated. Steps 550, 552, and 554 describe an algorithm for determining the TART metric. In addition to the TART metric, another algorithm, singular array reconciliation tomography (SART), may be used to determine a SART metric (step 556). The TART and SART metrics may be used in combination (step 558) to calculate a third metric. The most likely mobile unit position is then identified as the position where one or more of the calculated metrics is maximized (step 564). Each of these steps will be described in detail below.

For each scan grid position, the received location signal matrix is first rephased according to the method described above in relation to FIG. 2. The matrix R' of the received location signals is formed by undoing the time delay that would have been applied to the data by propagating through free space if the mobile unit was at that point (step 550). The RF mixers described in relation to FIG. 3 for upconverting the transmitted location signal and downconverting the received location signal are driven by different oscillators and are not synchronized, so they unpredictably go in and out of phase. Ideally, upconverting a signal with one mixer and downconverting with another mixer at the same frequency would reproduce the original signal. However, because the RF mixers are out of phase, a random phase offset $\tilde{\theta}(t)$ that is time-varying but constant across frequency is introduced: $R(t)=H(t)X(t)e^{j\tilde{\theta}(t)}$. Due to this mixer phase offset, the rephased matrix is:

$$R' = R'_{ideal} \begin{bmatrix} e^{j\tilde{\theta}_1} & \cdots & 0 \\ \vdots & \ddots & 0 \\ 0 & 0 & e^{j\tilde{\theta}_P} \end{bmatrix}.$$

In addition to the phase offset matrix, there would ordinarily be a time offset pre-multiplication matrix caused by sample clock drift in the formula for R'. However, for the TART algorithm, the time offset is eliminated by synchronizing the mobile unit with the reference units (step 552), discussed previously in the Synchronization section. The received location signal matrix rephased at the correct mobile unit location is then:

$$R^{*\prime} = [\ldots \gamma_{0,p} e^{j\tilde{\theta}_p} 1_{M\times 1} + e^{j(\omega \hat{t}_{0,p} + \tilde{\theta}_p) \circ \Sigma_{n=1}^{N_p-1}} \gamma_{n,p} e^{-j\omega \hat{t}_{n,p}} \ldots ]$$

wherein $\gamma_{n,p}$ is the attenuation for signal n and reference antenna p and $\hat{t}_{0,p}$ is the time delay test value from the rephasing procedure for reference antenna p. Of the rephased, synchronized matrices (one for each scan grid position), the matrix for the scan grid position nearest the actual mobile unit location should have the highest DC component. So, the TART metric is found (step 554) by summing the magnitudes of the DC components of the signals from each reference unit. First, the columns of the rephased matrix are summed, wherein the DC terms add constructively (in phase), while the AC sinusoids average out to zero or nearly zero for a large signal bandwidth:

$$1_{1\times M} R^{*\prime} = M[\gamma_{0,1} e^{j\tilde{\theta}_1} \ldots \gamma_{0,p} e^{j\tilde{\theta}_p} \ldots \gamma_{0,P} e^{j\tilde{\theta}_P}]$$

The absolute value of each element (elm) is then calculated to get the magnitude of the DC terms:

$$\text{elm}(1_{1\times M} R^{*\prime}) = M|\gamma_{0,1} \ldots \gamma_{0,p} \ldots \gamma_{0,P}|$$

Finally, these terms are summed to attain the TART metric for a scan grid position:

$$\text{TART metric} = M|\gamma_{0,1} + \gamma_{0,p} + \gamma_{0,P}|$$

The scale factor M is a constant which scales the value of the TART metric by the same amount at all scan grid locations, not changing the location of the global maximum, which is the position estimate.

Another algorithm to analyze the received location signals is singular array reconciliation tomography (SART), discussed in US Patent Application Publication No. 2010/0277339, the contents of which are incorporated herein in its entirety. This algorithm is similar to a TDOA RF based approach, but as in the TART algorithm, it considers data from all of the receiving antennas as one set, rather than performing individual 1D ranging estimates. Again, the received location signals are converted to a frequency representation and the received signal matrix is rephased as described above in relation to FIG. 3. While TART synchronizes the mobile and reference units eliminating the affect of the time offset, SART does not feature synchronization. Thus, the received location signal for SART includes mixer phase offset, $\tilde{\theta}(t)$, and sample clock drift, $\tilde{t}(t)$, giving the following rephased, received signal matrix for a scan grid position:

$$R' = \begin{bmatrix} e^{-j(\omega)_1 \tilde{\tau}} & \cdots & 0 \\ \vdots & \ddots & 0 \\ 0 & 0 & e^{-j(\omega)_M \tilde{\tau}} \end{bmatrix}$$

$$R'_{ideal} = \begin{bmatrix} e^{-j(\omega)_1 \tilde{\tau}} & \cdots & 0 \\ \vdots & \ddots & 0 \\ 0 & 0 & e^{-j(\omega)_M \tilde{\tau}} \end{bmatrix}.$$

Both of the diagonal matrices in the above equation are unitary. Multiplication of a matrix by a unitary matrix retains the singular values of the original matrix. Thus, the singular values of R' are the same as the singular values of $R'_{ideal}$, and the SART metric ignores any constant time-offset on all receive antennas' data. This means that the effects of sample clock drift are ignored; however, any absolute distance information from a particular receive antenna is also ignored. Therefore, SART is fundamentally a TDOA approach.

In order to estimate a mobile unit location from the above received location signal matrix, a SART metric of R' is evaluated at every trial point in the scan grid using singular value decomposition, which comprises the steps of QR decomposition, bidiagonalization, and diagonalization. The magnitude of the first singular value compared to the magnitude of other nonzero singular values forms the SART metric; the scan grid location with the highest SART metric is the location estimate.

The SART and TART metric may be used in conjunction to potentially find a more accurate metric than either the SART or TART metrics alone. Although the SART and TART metrics are used to estimate the same parameter, mobile unit location, they are weakly correlated in high multipath environments. In some cases, the SART and TART probability distributions are orthogonally skewed, and while one metric is accurate in one dimension, the other is accurate in another dimension. Thus, fusing the two metric outcomes of the algorithms may permit more accurate location estimation.

In order to build an estimator for the position of the mobile unit using a combination of SART and TART, the base station computer first constructs probability density functions (PDF), or likelihood functions, which correspond to the distributions of SART and TART metrics calculated from the received data (steps 554 and 556). The posterior distribution to be calculated is also a discrete number of points, in one implementation in the order of 10,000 points, which lie on planes stacked along the z-axis. A three dimensional location estimate x=x, y, z from the SART and TART metrics may be calculated using a Bayesian estimation process (step 558). In one implementation, barometric data received from sensors on the mobile unit, at one or more reference units, at the base station, or from another component, is used for height estimation in the Bayesian estimation process. For every point in the discrete scan grid, a posterior probability is calculated as follows:

$$P(D_{SART}, D_{TART}, D_b | x, I) \times P(x | I)$$

where $D_{SART}$ is the SART data, $D_{TART}$ is the TART data, $D_b$ is barometric data, and I is any available prior information, such as the inter-floor spacing or the location of stairs/elevators. The position in the scan grid where the posterior probability is maximized corresponds to the point in space where the mobile unit is estimated to be, based on the available data.

Strategies for accelerating the formation and search of the region can be utilized to reduce the computational requirements for location determination. For example, a coarse grained scan of a region of interest can be carried out, followed by a fine grained search on identified areas of interest within the scanned region. This process can further be improved by interpolating the results of the coarse search to narrow the areas of interest. Both Lagrangian and Spline interpolation methods, among others, are suitable for this purpose. In addition, or in the alternative, the search can be expedited by using gradient search methods known in the art.

Hardware Implementation

Figure 6:
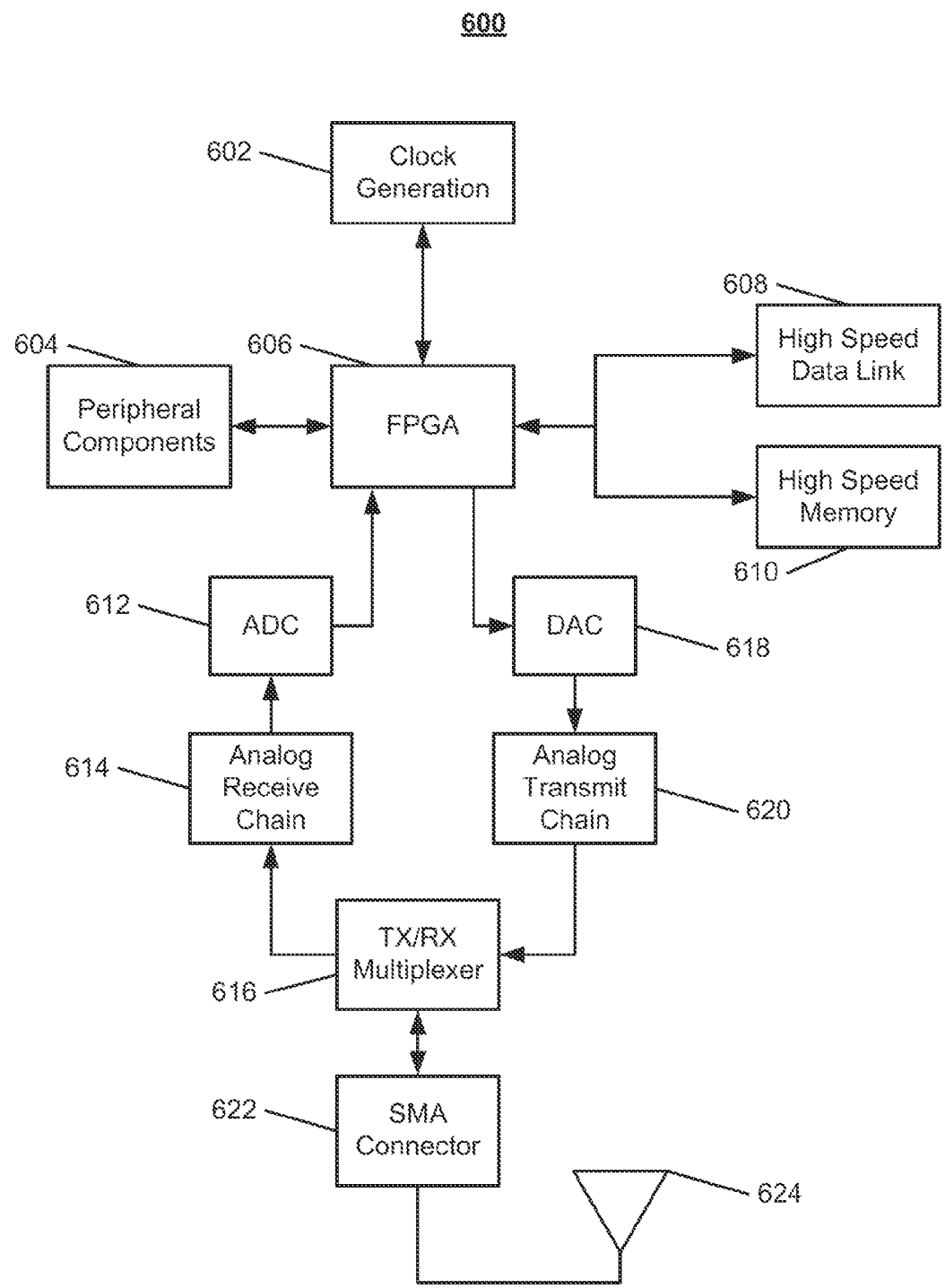
FIG. 6 is a block diagram of a transceiver for use in a system for precision location, according to an illustrative embodiment of the invention.

FIG. 6 is a block diagram of a transceiver 600 for use in a system for precision location, according to an illustrative embodiment of the invention. The transceiver 600, particularly the transceiving elements 612 through 624, may be used for both the mobile unit and the reference units, although certain components and features may differ. Clock generator 602 produces a timing signal for synchronizing the transceiver's operation. In one implementation, a phase-locked loop (PLL) is connected to a voltage controlled oscillator (VCO), wherein the PLL controls the VCO with a feedback loop to produce the desired clock output. The field programmable gate array (FPGA) 606, connected to the clock generator 602, stores the digital samples for the location and/or synchronization signals and forms the core of the transceiver, controlling its operation and performing any processing, such as discretizing the frequency-domain signals as discussed above in relation to FIG. 5A. The FPGA may be connected to peripheral components 604, such as sensors of user's vital signs, barometric sensors, other environmental sensors, and user interfaces, such as a distress button.

A high speed data link 608 is used to send location and/or synchronization signals to the base station using a wireless connection such as a ZIGBEE, BLUETOOTH, or WI-FI connection. In one embodiment, the high speed data link 608 sends a representation of the received waveform. A high speed memory 610 such as SRAM or DDR SDRAM stores the representation of the received waveform before sending it to the base station using the high speed data link 608.

The transceiving components 612-624 perform the functions needed to convert, send, and receive location and synchronization signals. For outgoing signals, the digital to analog converter (DAC) 618 first converts the digital receiver in memory to an analog signal. The analog transmit chain 620 may include amplifiers, mixers, and filters to prepare the analog signal for transmission. A multiplexer 616 is connected to the analog transmit chain 620 and a SubMiniature version A (SMA) connector 622, as well as an analog receive chain 614 for processing received signals. The SMA connector 622 connects the multiplexer to the antenna 624, which transmits and receives analog signals. The multiplexer 616 controls whether a signal travels from the analog transmit change to the SMA connector 622, or from the SMA connector to the analog receive chain 614. Alternatively, other switching elements may be used.

When an analog signal is received, it passes from the antenna 624 through the SMA connector 622 and the multiplexer to the analog receive chain 614. The analog receive chain 614 contains elements similar to the analog transmit chain 620 to prepare the signal for the analog to digital converter (ADC) 612. The ADC converts the analog signal into a digital signal and sends the digitized signal to the FPGA 606. Prior to use, the delay and frequency effects of all of the hardware elements (amplifiers, mixers, filters, cables, connectors, etc.) should be calibrated so their effects on the received signal may be removed in the transceiver 600 or at the base station computer before calculating the TART metric.

Experimental Results

Figure 7B:
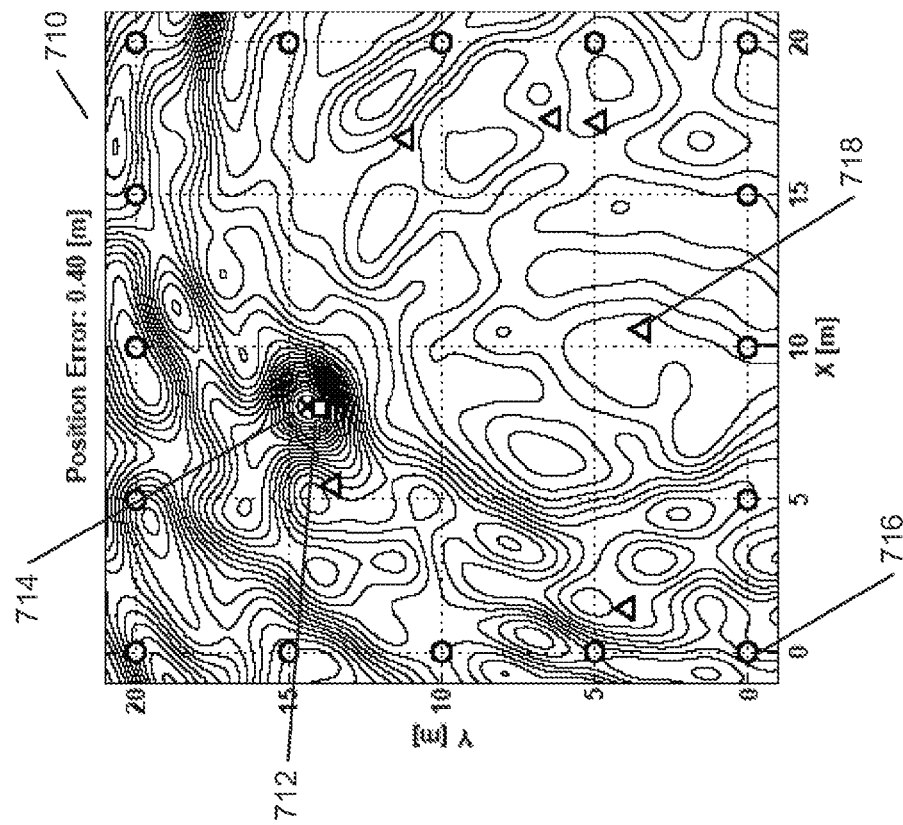
FIG. 7B is a contour map illustrating a two-dimensional result for a simulation of an exemplary locator system in an area with multiple reflectors consistent with the principles of this invention.
Figure 7A:
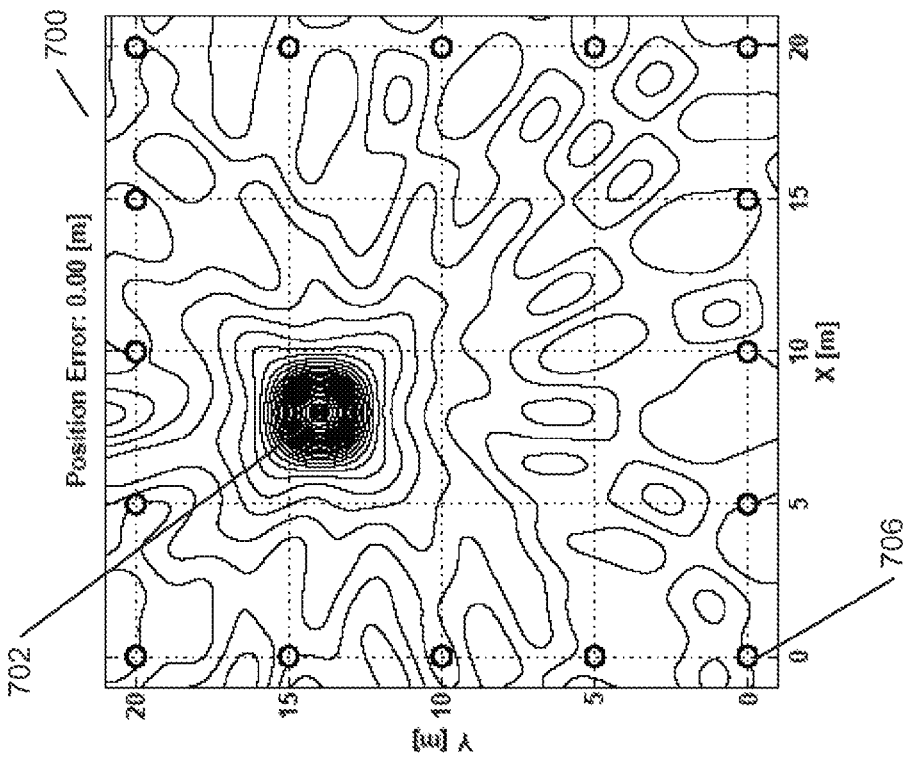
FIG. 7A is a contour map illustrating a two-dimensional result for an ideal simulation of an exemplary locator system consistent with the principles of this invention.

FIGS. 7A and 7B depict two two-dimensional TART simulation results. FIG. 7A depicts contour map 700 of an ideal simulation. Reference units are marked on the plot as circles 706 every five meters along the perimeter of the simulation area. The actual position of the mobile unit and the estimated position of the mobile unit 702 are indistinguishable, as there is zero position error between the actual and estimate. The contour lines grow closer together near the mobile unit, showing that the metric increases at a faster rate closer to the mobile unit.

FIG. 7B depicts contour map 710 of a simulation with six reflectors marked on the plot as triangles 718. The reference units are again marked on the plot as circles 716 every five meters along the perimeter of the simulation area. In this simulation, the actual mobile unit location is marked as square 712, while the estimated mobile unit location is marked as an "X" 714. Again, the contour lines grow closer together near the mobile unit, showing that the TART metric increases rapidly near the mobile unit. The position error is only 0.40 m between the actual and estimated location, and the contour lines do not show increases in the TART metric around the reflector areas, indicating that the TART algorithm is highly accurate in a high multipath environment.

Figure 8:
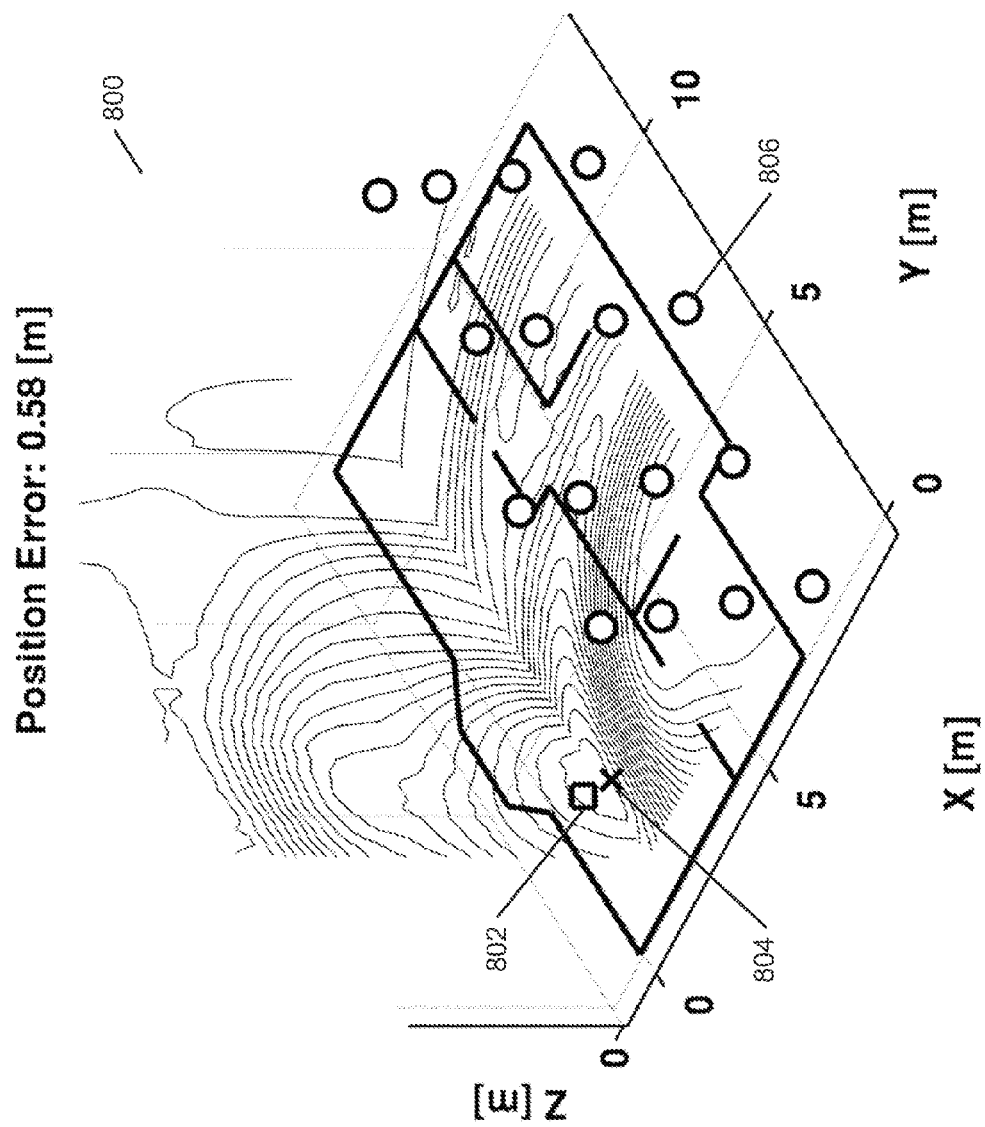
FIG. 8 is a contour map illustrating a three-dimensional experiment result of an exemplary locator system consistent with the principles of this invention.

FIG. 8 depicts the contour plot 800 from an experimental test on a working model of the TART system deployed around a three-story building. Four ladders with reference units at four heights were deployed along one side of the building, and a mobile unit was positioned inside the building on the first floor, 1.17 meters above the ground floor. On the contour plot 800, the reference units are marked with circles 806. The actual mobile unit location is marked as square 802, while the estimated mobile unit location is marked as an "X" 804. The position error is only 0.58 m between the actual and estimated location, and this would likely be even smaller if reference units were positioned along more sides of the building.

Additional Embodiments

In other embodiments, the device to be located could calculate its own position by receiving location signals from synchronized reference units having known locations. The same processing described above can be applied to the signals received by the single mobile unit to identify its position. That is, by scanning a set of potential locations, the mobile unit can identify its actual location by finding a location at which the TART metric is maximized.

Principles described herein may also be used for applications outside of position determination. For example, they may be used for active and passive multi-static radar applications, optical and radio astronomy, and Sonar systems. In various ones of the implementations described herein, the mobile unit may be replaced with a signal reflector or a signal repeater.

The embodiments described above have generally assumed that there is one mobile unit to be located. However, the systems and methods described herein may also be used to simultaneously locate multiple mobile units in a region of interest. In one embodiment, as many as 100 location signals may be received at the same time. In one multi-mobile unit location system, time is divided into a series of time slots. Each mobile unit is assigned a regular time slot in the series. The base station, in one implementation, transmits a signal for synchronizing the clocks of the mobile units and reference units. The reference units receive the time-multiplexed signal transmitted by the mobile units and extract each mobile unit's signal from the respective time slots. Alternatively, the signal differentiation can be carried out by the base station after receiving data about the full signal from the transceivers. Then the base station analyzes each mobile unit's respective location using any of the methodologies described above.

In other embodiments of the system that are configured for locating multiple mobile units, each mobile unit is assigned its own location wave form. For example, each mobile unit is assigned a set of carrier frequencies at which to transmit. In one implementation, the carriers are interleaved and do not overlap one another. The assignments of carrier frequencies are known by the base station. In one implementation, the base station conducts separate scans of the region of interest as described above using range rephased matrices that include the carriers of each respective mobile unit. In another implementation, the base station scans the region with a matrix that includes the carrier frequencies of all mobile units.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for locating an object comprising:
   a plurality of reference units for positioning about a region in which a mobile unit is located, each reference unit including a transceiver for transmitting and receiving unaligned location signals to and from the mobile unit; and
   circuitry configured to:
      estimate time offsets between a clock of the mobile unit and clocks of each of the plurality of reference units based on a synchronization transaction between the mobile unit and each of the plurality of reference units;
      align the location signals by removing the estimated time offsets; and
      collectively process data representative of the unaligned location signals and the aligned location signals to identify at least one of a plurality of potential locations as a likely mobile unit location, wherein collectively processing data comprises:
         calculating a first metric at the plurality of potential locations based on the aligned location signals;
         calculating a second metric at the plurality of potential locations based on the unaligned location signals; and
         calculating a posterior probability distribution at the plurality of potential locations by combining the first metric and the second metric using a Bayesian estimation process.

2. The system of claim 1, wherein calculating the first metric comprises constructing a first probability density function using transactional array reconciliation tomography.

3. The system of claim 1, wherein calculating the second metric comprises constructing a second probability density function using singular array reconciliation tomography.

4. The system of claim 1, wherein collectively processing the data further comprises calculating a third metric based on barometric data, and wherein the posterior probability distribution is based on a combination of the first metric, the second metric, and the third metric.

5. The system of claim 1, wherein the posterior probability distribution at the plurality of potential locations is equal to $P(D_{SART}, D_{TART}, D_b|x, I) \times P(x|I)$, where $D_{SART}$ is singular array reconciliation tomography data, $D_{TART}$ is transactional array reconciliation tomography data, $D_b$ is barometric data, x is a location estimate, and I is available prior information.

* * * * *